Figure 4:
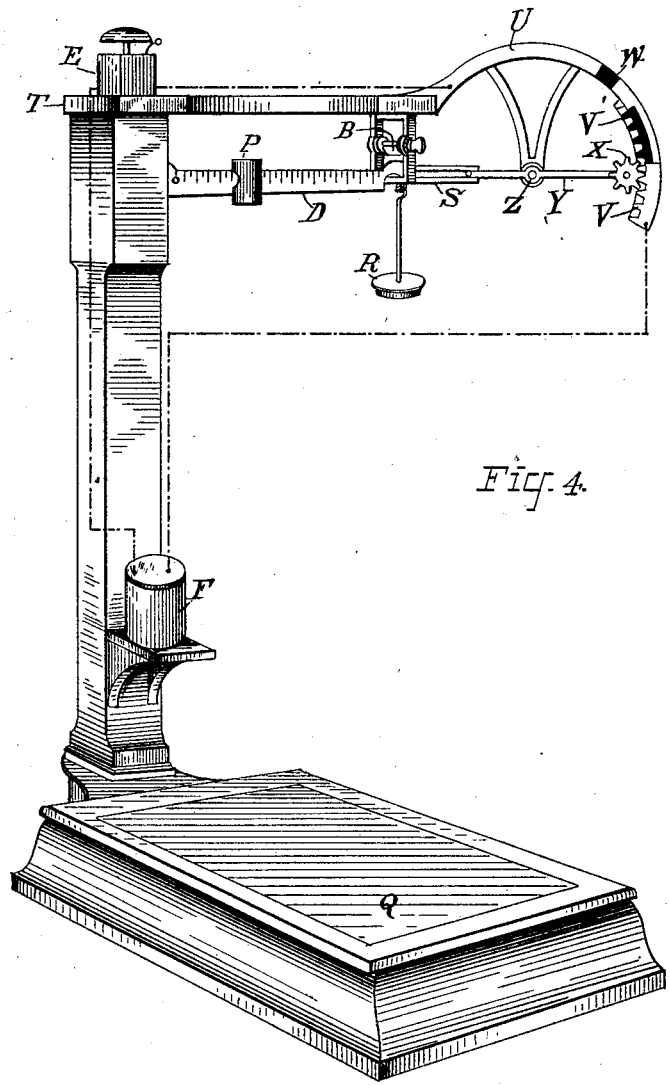

(No Model.) 2 Sheets—Sheet 1.
E. S. ENYART.
ELECTRIC SIGNAL FOR WEIGHING SCALES.
No. 361,275. Patented Apr. 19, 1887.
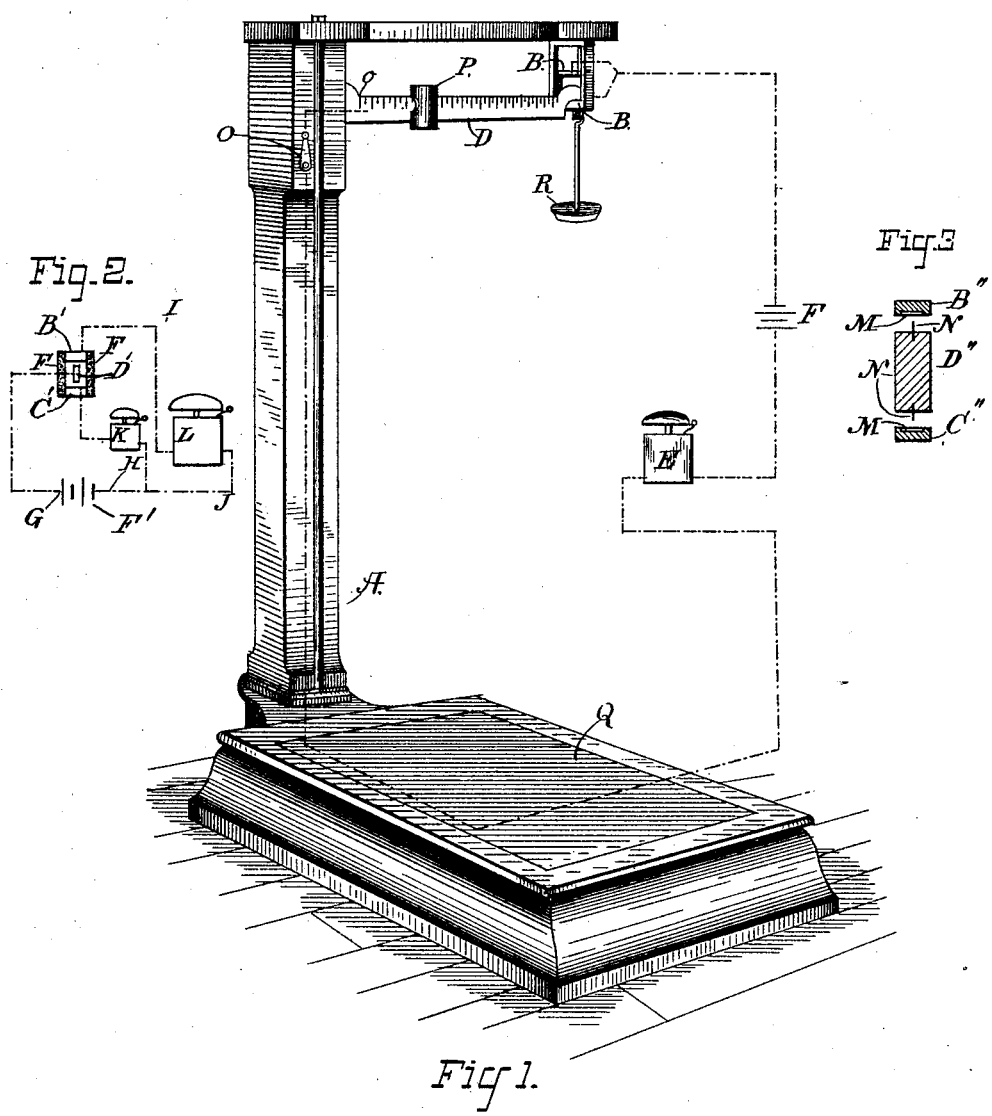

(No Model.) 2 Sheets—Sheet 2.

E. S. ENYART.
ELECTRIC SIGNAL FOR WEIGHING SCALES.

No. 361,275. Patented Apr. 19, 1887.

ATTEST:
J. A. Hurdle
Edward P. Thompson

INVENTOR:
E. S. Enyart
By
W. J. Johnston
Attorney

UNITED STATES PATENT OFFICE.

EDWIN S. ENYART, OF OTTAWA, ILLINOIS.

ELECTRIC SIGNAL FOR WEIGHING-SCALES.

SPECIFICATION forming part of Letters Patent No. 361,275, dated April 19, 1887.

Application filed September 2, 1886. Serial No. 212,451. (No model.)

*To all whom it may concern:*

Be it known that I, EDWIN S. ENYART, a citizen of the United States, and a resident of Ottawa, in the county of La Salle and State of Illinois, have invented certain new and useful Improvements in Electrical-Weighing Systems, of which the following is a complete, clear, and exact description, setting forth in general and in detail my invention.

My invention relates to an electric signal in combination with an apparatus or mechanism for weighing objects—such as merchandise, drugs, freight, live stock, grain, or groceries.

The object of the invention is to provide means whereby either the operator or a person at a distance may become aware when the exact weight of the object is recorded upon the scale, usually attached to the weighing device.

A second object is to provide means whereby one will be informed when the weighing device is not indicating the correct weight of any particular object or objects; also whether it is indicating too little or too great a weight.

The device consists of mechanism, hereinafter described and claimed, whereby an operator may be automatically informed, not only of the instant when a balance or similar weighing-instrument is in equilibrium, but also when the pointer of the instrument indicates too much or too little weight.

For the purpose of illustrating the practical manner of carrying out the invention, drawings are hereunto annexed and described, in which similar letters of reference represent corresponding elements, and in which each part referred to is designated by a single letter.

Figure 1 is a general exterior view of a representative weighing device well known in the art combined with my invention, the electrical circuit being shown by alternate dashes and dots. Fig. 2 shows a different disposition of the circuit and connections, and Fig. 3 an enlarged detail view of the contacts. Fig. 4 is a general view of a modification or another way of carrying out the invention, the circuit employed being normally open, so that a bell is sounded as soon as the correct weight is obtained. Of course this modification may itself be modified.

Referring particularly to Fig. 1, the combination of elements therein shown embraces a suitable weighing device, A, two terminals in an electric circuit, one terminal being the usual stops, B, each side of the scale-beam, and the other terminal being the scale-beam D itself, and electric signal—such as a bell, E—in said circuit, and a suitable electric generator, F, also in circuit.

In Fig. 2 is shown a combination consisting of the two stops B' C', for limiting the movements of the scale-beam D, two insulating-pieces, F, connecting said stops, an electric generator, F', having one pole, G, connected to the scale-beam and the other pole, H, connected to two branch circuits, I and J, including electric signals or bells K and L, of different quality or size, and a terminal for each branch, one terminal being one stop, B', and the other terminal being the other stop, C'.

Fig. 3 shows how the points of contact between the scale-beam and the stops therefor may be provided with platinum tips to prevent oxidation. B" and C" are the stops, M are pieces of platinum-foil therein, D" is the scale-beam, and N are platinum wires therein and projecting therefrom. The circuit is said to be normally open when the scale-beam touches neither stop, or when the weight stands at the extreme left at zero. When the operator has finished weighing, he should either open the switch O or move the weight P to zero, for otherwise the circuit would remain closed and the bell would continue to ring and the electrical energy would be wasted. The distance between the scale-beam and the stops should be slight, as shown more clearly in Fig. 2.

In Fig. 4 the system is shown as consisting of the combination of the scale-beam D, a projection, S, therefor, a frame or general support, T, a projection, U, to said frame and consisting of the segment of a circle having teeth V, a portion, V', of which are of insulating material, the said projections being divided by an insulating-piece, W, a pinion, X, gearing in said segment, a lever, Y, pivoted at Z and having operating connection both with the projections S and the pinion X, and an electric circuit (shown by alternate dashes and dots) passing through said segment and said pinion.

In order to operate the combination shown in Fig. 1, the operator places the object (not shown) upon the platform Q of the weighing device, places weights (not shown) upon the weight-holder R of said device, and moves the weight P, located upon the scale-beam, forward and backward until the bell E ceases to ring, the switch Q in the bell-circuit having been closed at the beginning of the operation.

In practice in the use of scales not provided with an electric signal it is well known that when the scale-beam touches neither stop or is horizontal the correct weight of the object is indicated by the position of the movable weight upon the scale-beam; therefore, when the bell ceases entirely to ring, it is known, without looking at the stops, that the weight is in the right position.

Concerning the operation of the system shown in Fig. 2, it is identical as far as the manipulations of the operator are involved, but the results are different, for if the scale-beam D' touches the stop B' the bell L rings, while if it touches the stop C' the bell K rings, thereby informing the operator whether or not the weight is moved too far or not far enough along the scale-beam.

In Fig. 4 the weight P is normally retained at the right end of the beam D, so that the pinion X will touch the insulating portion V and maintain an open circuit. If a person (not shown) stands upon the platform Q, the operator moves the piece P slowly to the left until the bell rings—i. e., until the pinion X is brought into contact with the metal portion V of the segment U. The gearing is so constructed that X will touch V when D is horizontal, whether the device shown in the drawings is accurately proportioned or not.

The invention is not limited to the precise construction hereinbefore described and shown, as it is evident that many modifications may be made therein without departing from the spirit of the invention.

Having now stated the object of the said invention, having described its practical realization by reference to the accompanying drawings, having particularly ascertained the manner in which the same operates to accomplish the said object, what I claim is—

1. In an electric-weighing system, the combination of a weighing device, an indicator therefor—such, for instance, as a scale-beam—stops for said indicator, and two electric circuits including signals of different qualities, one circuit passing from the indicator to one stop and the other circuit passing from said indicator to the other stop.

2. In an electric-weighing system, the combination, with a balance or a similar weighing device, of an indicator therefor, such as a scale-beam, a toothed segment, and metallic pinion working therein, an operating connection—such as a pivoted lever—between said beam and said pinion, and an electric circuit passing through said pinion and said toothed segment, a portion of said segment being of insulating material and the remainder of electric conducting material, substantially as and for the purpose described.

3. In an electric-weighing system, the combination, with a weighing device, of a scale-beam, a projection therefor, a projection to a stationary part of said device, a toothed segment, partially of insulating material and located upon said last-named projection, a pinion working in said toothed segment and having operating connection with said first projection, and an electrical circuit passing through said pinion and said segment and being normally open through said insulating portion, substantially as and for the purpose described.

In witness whereof I have hereunto affixed my seal and signed my name in the presence of two subscribing witnesses.

EDWIN S. ENYART. [L. S.]

Witnesses:
D. McDougall,
B. L. Bonar.